April 7, 1925.
F. G. BLOCH
LEVEL INDICATING DEVICE
Filed Dec. 1, 1920
1,532,871
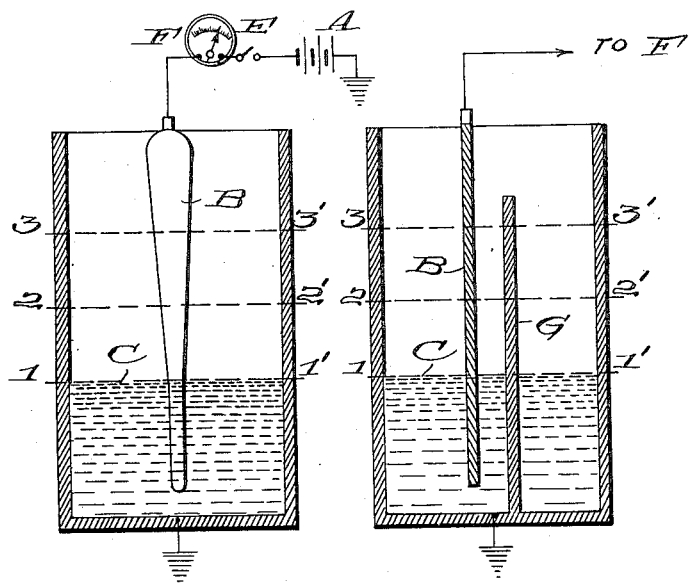

Patented Apr. 7, 1925.

1,532,871

UNITED STATES PATENT OFFICE.

FRANZ GEORG BLOCH, OF BOBLINGEN, GERMANY.

LEVEL-INDICATING DEVICE.

Application filed December 1, 1920. Serial No. 427,648.

(GRANTED UNDER THE PROVISIONS OF THE ACT OF MARCH 3, 1921, 41 STAT. L., 1313.)

*To all whom it may concern:*

Be it known that FRANZ GEORG BLOCH, citizen of the Republic of Germany, residing at Boblingen, in Wurttemberg, Germany, has invented certain new and useful Improvements in Level-Indicating Devices (for which he filed applications in Germany Jan. 30, 1917, and Great Britain July 10, 1920), of which the following is a specification.

The present invention relates to an improvement in that type of electrical distance meters for indicating the levels of liquids which are regulated only by the electrical conductivity and not by mechanical impulses as for example by floats. By these devices the level of a liquid at any desired distance from the indicator is measured owing to the fact that the resistance of the circuit is altered by the rising or falling level and the alteration of the latter may be read on an indicating scale. This is substantially obtained by inserting a resistance body in the tank of liquid in an isolated manner, the said body projecting well below the liquid level and above the top of the tank. The resistance body being in contact with the liquid forms part of the electric circuit and thus the indicator varies according to the amount of the resistance body contacting with the liquid, thereby entirely avoiding mechanically movable parts of any kind.

Hitherto in apparatus of this type, the resistance rod has had a uniform resistance thruout its entire length. In the present invention the rod is so constructed that systematical alteration of the resistance is obtained in the different levels.

The advantage of the device according to the invention is that the level of the liquid may be accurately read off also in the case of liquids of high electrical resistance. The essential part of the measuring device, according to the invention, is formed by a massive resistance-body of great surface, the material of which is resistant to outer influences, and of a high electrical resistance.

The high electrical resistance of the body results in a relatively great alteration of resistance in small alterations of the level and consequently in a relatively great variation of the indicator. The great surface results in a small contact-resistance with respect to the total resistance of the circuit, so that the part of the resistance moistened by the liquid may be neglected. The special shape, in the case of a material of uniform conductivity, permits the alteration of the resistance with respect to the height of the liquid in such a way that a proportional and continual shifting of the indicator may be obtained, since the cross section is small at the lower end and gradually increases towards the top. However, the resistance-body instead of being so formed may be constructed of materials of different conductivity or the same result may be obtained by simultaneously varying the cross section of the resistance-body from one end to the other and employing materials of different conductivity in the different levels.

The device, which may be advantageously employed when the liquid is of non-constant specific resistance, is preferably combined with a bar-body of high conductivity, the latter being arranged at a small distance from and parallel to the resistance-body. This bar-body may be earthed or led into the circuit by a wire. It is preferably shorter than the resistance-body, because the influence of the specific resistance of the liquid may be neglected on the upper parts of the resistance-body. When employing the bar-body, in the manner described, the path of the current thru the liquid is very small with respect to the total resistance of the circuit. A modification of the resistance of the liquid is then without influence.

In order to produce a quick and sure passage for the current the resistance-body may be provided at its lower end with a greater surface say, with a shoe, so that the surface moistened by the liquid is very much increased without sensible alteration of the resistance of the measuring apparatus.

Employing a voltage of 100 and an indicating meter registering 10 milliamperes when the liquid contacts with the rod, the liquid when it has risen one tenth of the length of the rod will cause the meter to register 20 milliamperes and registers 190 milliamperes when it has attained the maximum level.

The resistance of the lower tenth part of the rod is calculated in accordance with Ohm's law by the difference in resistance when the liquid contacts with rod and when the liquid has risen to contact with one tenth of the rod.

When the liquid contacts, the resistance is found thus:

Current × resistance = E. M. F.

$$\frac{10}{1000} \text{ amps.} \times \text{resistance} = 100 \text{ volts.}$$
$$\text{resistance} = 10{,}000 \text{ ohms.}$$

When the liquid contacts with one tenth of the rod the indicator registers 20 milliamperes and the resistance is:

$$\frac{20}{1000} \text{ amps.} \quad \times \text{resistance} = 100 \text{ volts}$$
$$\text{resistance} = 5000 \text{ ohms.}$$

Therefore the resistance of the lower one tenth of the rod is 5,000 ohms.

When the liquid rises to the maximum the indicator registers 190 and therefore the resistance is:

$$\frac{190}{1000} \text{ amps.} \times \text{resistance} = 100 \text{ volts}$$
$$\text{resistance} = 526.3$$

In order that my invention may be clearly understood reference is directed to the accompanying drawing in which: Fig. 1 is a vertical elevation, partly in section. Fig. 2 is a vertical section of a modified form, the section being taken at 90° to that shown in Fig. 1. Fig. 3 is a detail showing a shoe attached to the resistance-body.

A represents a source of current having a known E. M. F., the current flowing from A through the switch E, the indicator F, the resistance-body B of the measuring apparatus, the liquid C, the level of the latter being at 1—1' through the earth and again to the battery A.

The resistance of the body B is so defined, that for a definite level-distance 2—2' and 3—3', the contact resistance between the liquid and the moistened surface of the body B is considerably smaller than the inner ohmical resistance of that part of the body B limited by the planes 2—2' and 3—3'. Therefore, when the liquid rises from 2—2' to 3—3', the resistance of the body B becomes smaller by an amount corresponding to the additional part in contact with the liquid resulting in a greater shifting of the indicator. This continual and proportional shifting is obtained without difficulty by shaping and constructing the resistance-body in the manner described.

In Fig. 2 the bar-body G is shown. It is preferably employed in liquids with a non-constant resistance coefficient.

In Fig. 3 the shoe D is shown attached to the lower end of the resistance-body B thereby affording a quick and sure contact when the body is immersed. The shoe D may be connected to the bar-body B by means of rivets.

The apparatus in consequence of its simple construction is insensible to mechanical and chemical influence, very dependable and of simple manufacture, in so far as the resistance body may be cast or pressed to the required form. Notwithstanding its simplicity, it permits very exact measurements and in consequence thereof presents important advantages over the apparatus of this type known heretofore.

When the measurement of the level of liquids of high specific resistance is required it is found that the use of a coil arrangement does not fulfil the conditions required as it is practically impossible to give to a coil of definite height a great surface and simultaneously the high resistance required for accurate measurement.

Having now particularly described and indicated the nature of my invention and its operation I claim:

1. The combination with a body of liquid, of a resistance element extending downwardly into the liquid to a predetermined level and an electric circuit connected to the top of the resistance element and providing a terminal at a level below the lower end of the element whereby the circuit includes the resistance element and a gap filled by the liquid, the resistance element having a high specific resistance increasing substantially uniformly from top to bottom.

2. A combination according to claim 1 in which the said element has a cross-section decreasing substantially uniformly from top to bottom.

3. A combination according to claim 1 including a conductor of low resistance extending substantially parallel to the said element from a level near the top thereof to a level below the lower end thereof and electrically connected to said terminal.

4. The combination with a metal tank, of a resistance element extending nearly to the bottom of the tank and an electric circuit connected to the top of the element and to the tank, thereby including the element and a gap in the tank in series, the resistance element having a specific resistance increasing substantially uniformly from top to bottom.

5. The combination according to claim 4 including a conductor of low resistance extending substantially parallel to the resistance element to the bottom of the tank.

FRANZ GEORG BLOCH.